No. 690,354. Patented Dec. 31, 1901.
M. P. BRISCOE.
COMBINED PLANTER AND FERTILIZER DISTRIBUTER.
(Application filed Mar. 26, 1901.)
(No Model.)

Witnesses M. P. Briscoe, Inventor.

UNITED STATES PATENT OFFICE.

MADISON P. BRISCOE, OF ATHENS, GEORGIA.

COMBINED PLANTER AND FERTILIZER-DISTRIBUTER.

SPECIFICATION forming part of Letters Patent No. 690,354, dated December 31, 1901.

Application filed March 26, 1901. Serial No. 52,988. (No model.)

*To all whom it may concern:*

Be it known that I, MADISON P. BRISCOE, a citizen of the United States, residing at Athens, in the county of Clarke and State of Georgia, have invented a new and useful Combined Planter and Fertilizer-Distributer, of which the following is a specification.

My invention is an improved combined cotton-planter and fertilizer-distributer; and it consists in the peculiar construction and combination of devices hereinafter set forth and claimed.

Figure 1:
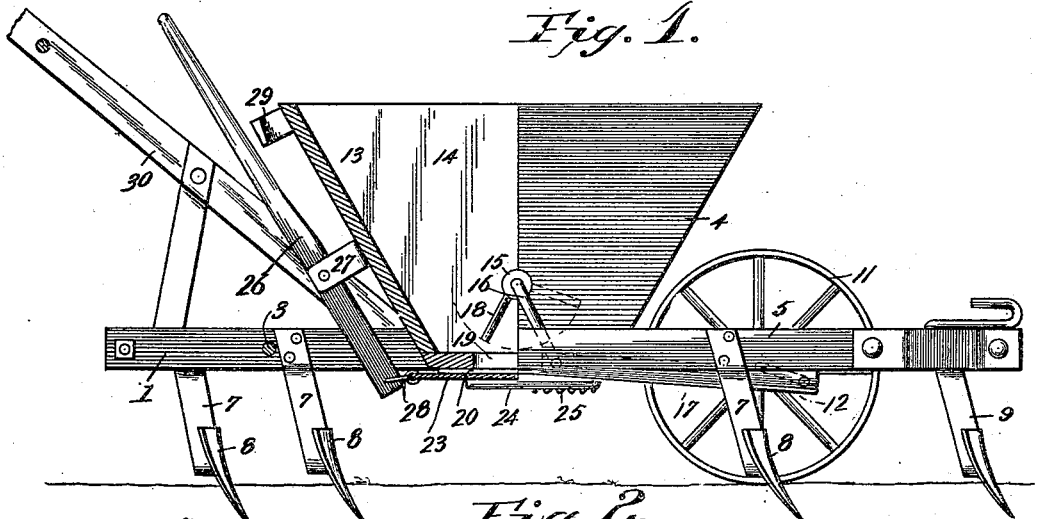
Figure 2:
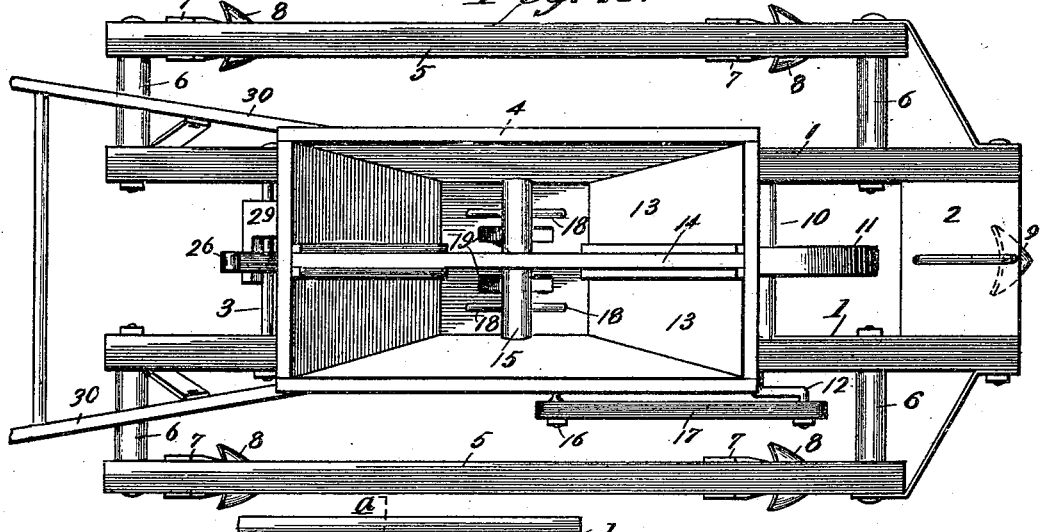
Figures 3, 4:
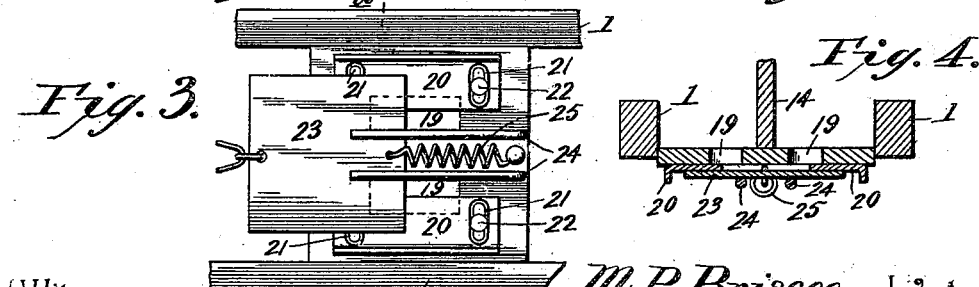

In the accompanying drawings, Figure 1 is a side elevation, partly in section, of a combined cotton-planter and fertilizer-distributer constructed in accordance with my invention. Fig. 2 is a top plan view of the same. Fig. 3 is a detail bottom plan view. Fig. 4 is a detail transverse sectional view taken on a plane indicated by the line *a a* of Fig. 3.

The longitudinally-disposed beams 1 are connected together at their front ends by a cross-bar or platform 2, are connected together at a suitable distance from their rear ends by a cross bolt or rod 3, and between the said beams is disposed the lower side of the hopper 4, the said hopper being supported by the said beams. On the outer sides of the beams 1 are beams 5, which are parallel therewith and are connected thereto at the ends of the beams 5 by cross bars or bolts 6. The beams 5 are spaced at a suitable distance from the beams 1, the latter and also the beams 5 being provided with standards 7, to which are attached suitable shovels or plows 8. A furrow-opening plow 9 is carried at the front end of the frame composed by the said beams 1 5 and their connections.

A shaft 10 is journaled in suitable bearings in the beams 1 and is disposed in advance of the hopper. On this shaft is a wheel 11, which runs in the furrow, and the said shaft is provided at one end with a crank 12.

The hopper is divided into a pair of compartments 13 by a longitudinally-disposed partition 14. A rock-shaft 15 is disposed transversely of the hopper, has its bearings in the sides thereof, and is provided at one end with a crank-arm 16, which is connected to the crank 12 by a pitman 17. Thereby the shaft 15 is caused to oscillate when the machine is in motion, as will be understood.

Said shaft 15 is provided with radial stirring-arms 18, which operate in the compartments of the hopper above the discharge-openings 19 of the latter, which discharge-openings are oblong, as shown. The function of the shaft 15 and the radial arms 18 is to stir and agitate the cotton-seeds and fertilizer placed in the respective compartments of the hopper, prevent the same from clogging, and cause the same to be discharged through the openings 19 in the bottom of the hopper into the furrow made by the furrow-opener 9. The plows, which are disposed in rear of the hopper and are carried by the beams 1, cover the seeds and fertilizer in the furrow, as will be understood.

On the lower side of the bottom of the hopper on the outer side of the openings 19 are adjusting-plates 20, which are provided near their ends with transverse slots 21. Bolts or other suitable fastening devices 22 secure the said adjusting-plates 20 under the bottom of the hopper, the said bolts operating in the slots 21 and the latter admitting of the lateral adjustment of said plates 20, whereby the latter are adapted to partly close the openings 18 to any required extent in order to regulate the quantity of seeds and fertilizer discharged from the hopper at each operation of the machine.

A cut-off plate 23 operates on the lower sides of the adjusting-plates 20 and is supported in position by longitudinally-disposed guide-rods 24 on the lower side of the hopper, the said guide-rods bearing under the said cut-off plate. A spring 25 is connected to the front end of the cut-off plate and to the bottom of the hopper, the function of this spring being to close the cut-off plate under the openings 19, and thereby cut-off the discharge of seeds and fertilizer from the hopper. A lever 26 is loosely pivoted to a support 27, which projects from the rear end of the hopper, the lower end of this lever being connected to the rear end of cut-off plate by a link 28. A catch 29 on the rear side of the hopper is engaged by the upper portion of the lever when the latter is moved in such position as to open the cut-off plate 23 from under the openings 19, the said catch securing the said lever and cut-off plate in this position when the machine is in operation. When it is desired to discontinue the operation of the machine, the lever 26 is disengaged from the catch 29, whereupon the spring 25 instantly closes the cut-off plate 23, as will be understood.

I employ suitable handles 30, by means of which the operator, who walks in rear of the machine, is enabled to guide the same. The plows which are carried by the beams 5, disposed on the outer sides of the beams 1, serve, in connection with the covering-plows, to thoroughly stir the soil between the rows, and thereby promote the early growth of the plants.

Having thus described my invention, I claim—

In a planter and fertilizer-distributer, a hopper having discharge-openings in its lower side and a partition, between said discharge-openings, laterally-movable adjusting-plates on the bottom of the hopper to vary the size of said openings, a longitudinally-movable cut-off plate under and in contact with and overlapping said adjusting-plates, guide-rods secured to the bottom of the hopper, bearing under said cut-off plate and supporting the same in contact with the lower side of the adjusting-plates, a lever connected to said cut-off plate, a catch to detain said lever in position to open said cut-off plate, and a spring to close the latter when said lever is disengaged from said catch, substantially as described.

In testimony that I claim the foregoing as my own I have hereto affixed my signature in the presence of two witnesses.

MADISON P. BRISCOE.

Witnesses:
C. W. COOPER,
E. J. CRAWFORD.